(Model.)
R. POINDEXTER.
Tire Shrinker.
No. 237,205.  Patented Feb. 1, 1881.
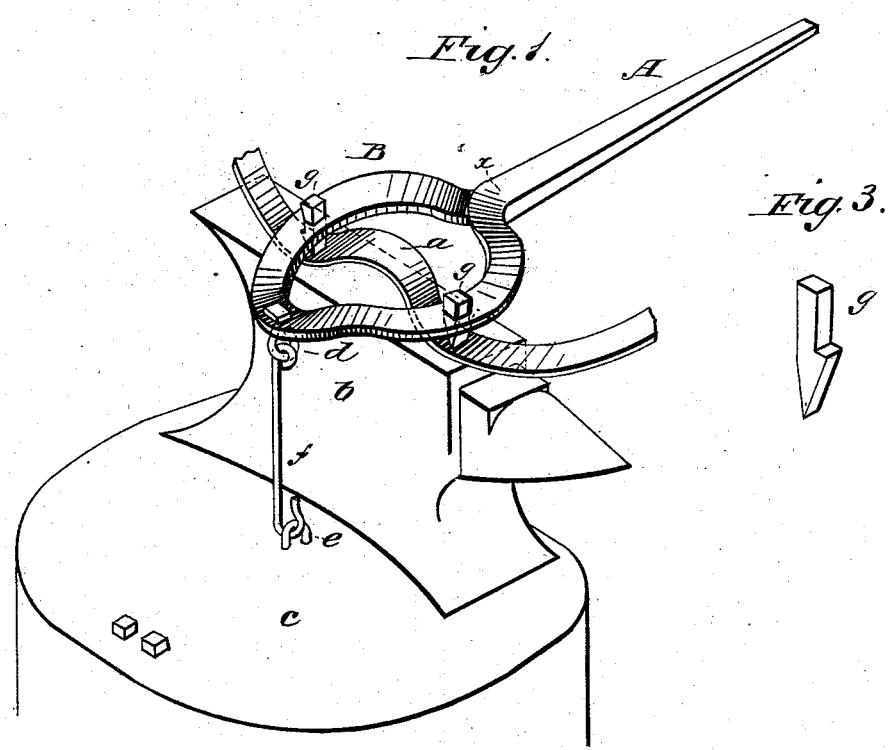
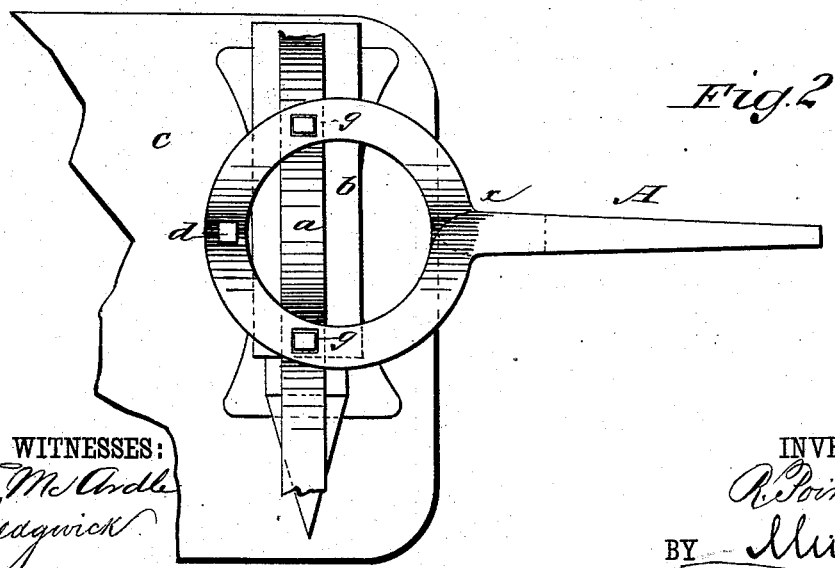

UNITED STATES PATENT OFFICE.

RICHARD POINDEXTER, OF BETHANIA, NORTH CAROLINA.

TIRE-SHRINKER.

SPECIFICATION forming part of Letters Patent No. 237,205, dated February 1, 1881.

Application filed November 6, 1880. (Model.)

*To all whom it may concern:*

Be it known that I, RICHARD POINDEXTER, of Bethania, Forsyth county, State of North Carolina, have invented a new and useful Improvement in Tire-Shrinkers, of which the following is a specification.

This invention relates to tire-shrinkers, and has for its object the production of a cheap, simple, and effective device for holding a tire upon the anvil while it is being operated upon to shrink it, or, in other words, upset by hand-forging.

Figure 1 represents, in perspective, a tire-shrinker embodying my invention in position upon and holding a tire bent at its center ready to be upset by hand-forging. Fig. 2 is a top view of Fig. 1, and Fig. 3 is a perspective view of one of the holding spurs or teeth.

Similar letters of reference indicate corresponding parts.

The lever A, formed of ordinary tire or bar iron, is bent at one end and welded to itself at $x$, to form an eye or loop, B, of sufficient diameter to overreach the upwardly-bent portion $a$ of the tire resting upon the anvil $b$ ready to be upset. This lever A is connected at its looped end with the anvil $b$, or with the anvil-block $c$, by means of hook $d$, staple $e$, and connecting-link $f$, or other suitable means of attachment.

The eye B of lever A will preferably be concaved at its extreme ends to allow free access to the bent portion of the tire, and is provided at opposite sides with spurs or teeth $g$ $g$, entered through holes made in the eye for their reception, said spurs being driven into the tire each side its bent portion, so as to prevent its slipping when lever A is pressed down by the operator.

Instead of leaving the long end of the lever A free to be held by hand, it is obvious that I may employ means to hold it down—as, for instance, a weight; or, if desired, I may attach a stirrup to it to be operated by the foot of the operator.

Having thus described my invention, I claim as new and desire to secure by Letters Patent—

In tire-shrinkers, the lever A, having one end bent to form an eye or loop, B, and having said loop connected with the anvil-block $c$ by hook $d$, staple $e$, and link $f$, said loop being concaved to receive the bent portion of the tire, and provided with opposite side spurs, $g$ $g$, as shown and described.

RICHARD POINDEXTER.

Witnesses:
N. S. COOK,
B. Y. RAYLE.